United States Patent
Peeters et al.

(10) Patent No.: US 9,906,505 B2
(45) Date of Patent: Feb. 27, 2018

(54) RSA DECRYPTION USING MULTIPLICATIVE SECRET SHARING

(71) Applicant: NXP B.V., Eindhoven (NL)

(72) Inventors: Michael Michel Patrick Peeters, Leuven (BE); Ventzislav Nikov, Heverlee (BE)

(73) Assignee: NXP B.V., Eindhoven (NL)

( * ) Notice: Subject to any disclaimer, the term of this patent is extended or adjusted under 35 U.S.C. 154(b) by 208 days.

(21) Appl. No.: 14/707,712

(22) Filed: May 8, 2015

(65) Prior Publication Data

US 2017/0012948 A1    Jan. 12, 2017

(51) Int. Cl.

| | |
|---|---|
| *H04L 29/06* | (2006.01) |
| *H04L 9/08* | (2006.01) |
| *H04L 9/30* | (2006.01) |
| *H04L 9/06* | (2006.01) |
| *H04L 9/32* | (2006.01) |

(52) U.S. Cl.
CPC ........ *H04L 63/0435* (2013.01); *H04L 9/0618* (2013.01); *H04L 9/085* (2013.01); *H04L 9/302* (2013.01); *H04L 9/3247* (2013.01); *H04L 63/061* (2013.01); *H04L 63/0853* (2013.01)

(58) Field of Classification Search
None
See application file for complete search history.

(56) References Cited

U.S. PATENT DOCUMENTS

| | | | | |
|---|---|---|---|---|
| 5,588,061 A * | 12/1996 | Ganesan | ........... | H04L 9/085 380/285 |
| 5,905,799 A * | 5/1999 | Ganesan | ........... | H04L 9/302 380/277 |
| 6,195,433 B1 * | 2/2001 | Vanstone | ........... | H04L 9/3066 380/285 |
| 6,307,936 B1 * | 10/2001 | Ober | ........... | G06F 8/60 380/277 |
| 6,901,512 B2 * | 5/2005 | Kurn | ........... | H04L 9/083 380/277 |
| 9,043,927 B2 * | 5/2015 | Hu | ........... | H04W 12/06 726/26 |
| 2002/0071560 A1 * | 6/2002 | Kurn | ........... | H04L 9/083 380/277 |
| 2002/0154768 A1 * | 10/2002 | Lenstra | ........... | H04L 9/302 380/30 |
| 2003/0059041 A1 * | 3/2003 | MacKenzie | ........... | H04L 9/008 380/28 |

(Continued)

FOREIGN PATENT DOCUMENTS

WO     2013004691 A1     1/2013

OTHER PUBLICATIONS

Rohini G., Dynamic router selection and encryption for data secure in Wireless Sensor Networks, Information Communication and Embedded Systems (ICICES), 2013 International Conference on Feb. 21-22, 2013.*

Tsudik, G., "Weak Forward Security in Mediated RSA", Security in Communication Networks, Third International Conference, SCN 2002, Sep. 11-13, 2002, Sep. 1, 2002 (Sep. 1, 2002), pp. 45-54, XP055305389, ISBN: 978-3-540-00420-2, Retrieved from the Internet: URL: http://www.ics.uci.edu/~gts/paps/t02.pdf [retrieved on Sep. 26, 2016].

(Continued)

*Primary Examiner* — Farid Homayounmehr
*Assistant Examiner* — Olanrewaju Bucknor

(57) ABSTRACT

An embodiment features an RSA process in which the private key is separated into shares. Decryption (and authentication and other RSA objectives) may be accomplished by successive modular exponentiation of, for example, a ciphertext or a signature.

20 Claims, 2 Drawing Sheets

$$C \bullet \xrightarrow{d_1^+} \bullet \xrightarrow{d_2^+} \bullet \xrightarrow{d_3^+} \bullet \; M = \left((C^{d_1^+})^{d_2^+}\right)^{d_3^+} \bmod N$$

$$C \bullet \xrightarrow{d_3^+} \bullet \xrightarrow{d_2^+} \bullet \xrightarrow{d_1^+} \bullet \; M = \left((C^{d_3^+})^{d_2^+}\right)^{d_1^+} \bmod N$$

(56) References Cited

U.S. PATENT DOCUMENTS

| | | | | |
|---|---|---|---|---|
| 2009/0183009 | A1* | 7/2009 | Delfs | G06F 21/74 713/193 |
| 2010/0254532 | A1* | 10/2010 | Brickell | G06F 7/723 380/28 |
| 2011/0150213 | A1* | 6/2011 | Michiels | G06F 7/723 380/44 |
| 2014/0006803 | A1* | 1/2014 | Bodis | G06F 21/602 713/189 |
| 2014/0032932 | A1* | 1/2014 | Hiar | G06F 11/366 713/190 |
| 2014/0310527 | A1 | 10/2014 | Veugen et al. | |
| 2015/0326563 | A1* | 11/2015 | Chan | H04L 63/0823 713/172 |
| 2016/0065370 | A1* | 3/2016 | Le Saint | H04L 9/0841 713/155 |

OTHER PUBLICATIONS

Extended European Search Report dated Oct. 5, 2016, from EP Application No. 16165733.3.
Boneh, et al., "Exposing an RSA Private Key Given a Small Fraction of its Bits", K. Ohta and D. Pei., eds., vol. 16514, 1998, 25-34.
Boneh, "Twenty Years of Attacks on the RSA Cryptosystem", Notices of the AMS, 46 (1999) Feb. 1999, 203-213.
Mihir Bellare et al: "The Security of Practical Two-Party RSA Signature Schemes", International Association for Cryptologic Research, vol. 20020610:021238, Jun. 10, 2002 (Jun. 10, 2002), pp. 1-26, XP061000234.

\* cited by examiner

RSA DECRYPTION USING MULTIPLICATIVE SECRET SHARING

FIELD

This disclosure relates in general, to cryptographic process, and more particularly to RSA based processes.

BACKGROUND

Asymmetric cryptography, also known as public-key cryptography, is a subset of cryptography that refers to cryptographic processes requiring two separate keys. One key, called the private key, is used to decrypt and sign messages. The other key, called the public key, is used to encrypt messages and verify message signatures. As their name suggests, the private key is privately kept by a single entity, whereas the public key is usually distributed to many different entities. Let's call Alice the entity that owns the private key, and Bob any entity that has a copy of the public key. Thanks to this asymmetric setup, any entity can send a confidential message to Alice, but only she can decrypt it. Also, if Alice signs a message, any entity may check that the message was not tampered with by verifying the signature using Alice's public key. If this verification succeeds, then it also means that Alice did sign the message since only her private key can generate valid signatures for that public key (this process is known as non-repudiation).

A well-known asymmetric cryptographic process is RSA. Let $\mathbb{Z}^*_N$ denotes the set of integers $\{1, 2, \ldots, N-1\}$, and $N=pq$ be the product of two primes of equal size. N is called the RSA modulus. An RSA public key is the pair $\langle N,e \rangle$ where e is usually chosen in the set $\{3, 17, 2^{16}+1\}$. The corresponding RSA private key is the pair $\langle N,d \rangle$, where d is computed such that for any integer $M \in \mathbb{Z}^*_N$, we have $M e^d$ mod $N=M$. To compute d, Alice first computes the Euler totient function $\phi(N)=(p-1)(q-1)$, then computes d as the multiplicative inverse of e modulo $\phi(N)$, that is, $d=e^{-1}$ mod $\phi(N)$.

After this set up phase, the encryption and decryption operations are straightforward. In RSA, the plaintext message is represented by an integer $M \in \mathbb{Z}^*_N$. To encrypt that message using Alice's key, Bob Computes $$C=M^e \bmod N$$

which produces the ciphertext C. When Alice receives this message, she performs the reverse operation using her private key, that is, $$M=C^d \bmod N$$

The operations above are usually implemented in an electronic device. We focus below on the process and device used for signing or decrypting messages using Alice's private key. Besides performing these operations of signing or decrypting, these process and devices may also be used to protect the confidentiality of the private key against a malicious attacker that we will call Marvin, trying to eavesdrop or to tamper with the communication between Alice and Bob. Marvin's attack succeeds if he manages to sign or decrypt a message without Alice's consent. The most serious attack is the attack in which Marvin succeeds in extracting Alice's private key from the device itself.

There are many known methods for attempting this attack. For instance, Marvin may observe power consumption or electro-magnetic emissions of the device and extract the bits of the private keys using side-channel analysis. Marvin may also manipulate the device, change the operating conditions or tamper with essential components of the device so that the device outputs part of its memory content. This could happen, for instance, if at the time the message is output by the device, the pointer containing the address of the decrypted message is corrupted to point to a random address in memory. The attack succeeds if this address is within the memory zone containing Alice's private key.

Note that Marvin does not need to guess all the bits of the private key to succeed. Partial key exposure attacks allow attacker to recover the entire private key from only a partial knowledge of the key bits. First it is well-known that when the public key exponent, e, is small, then the RSA system leaks half of the most significant bits of the corresponding private key exponent, d; see Dan Boneh, '*Twenty years of attacks on the RSA cryptosystem*', Notice of the AMS, page 203-213, February 1999. In another paper, Boneh et al. demonstrated the following theorem stating that Marvin can retrieve the full private key exponent from only a fraction of the least significant bits, as long as the corresponding public key is small, see Dan Boneh, et al. '*Exposing an RSA private key given a small fraction of its bits*', (K. Ohta and D. Pei, eds), vol. 1514, 1998, pages 25-34.

Boneh, et al.'s theorem is: Let $\langle N, d \rangle$ be a private RSA key in which N is n bits long. Given the $\lceil n/4 \rceil$ least significant bits of d, Marvin can reconstruct all of d in a time linear in e $\log_2$ e.

The attack based on the theorem above works if Marvin knows the n/4 least significant bits of d. Conversely, we can show a similar result if Marvin knows all bits except for these n/4 least significant bits. There are many other variants of this attack.

There are also a variety of known countermeasures to oppose these attacks. One such countermeasure is secret sharing, also known as multi-party computation. In that method, the private key d, is split into several secret parts $d_1$, $d_2, \ldots, d_k$ that are all used independently. Each key produce an intermediate message after decryption of the cipher-text, and these intermediate messages are then combined together to obtain the original clear-text message. This process is such that each private key share does not reveal any information about the original private key, and in the same way, each intermediate message does not disclose any information about the origin clear-text message. FIG. 1 illustrates the secret sharing concept. In FIG. 1, each exponentiation $C^{d_i^+}$, with i=1, 2, 3 can be done in parallel and by separate entities to reduce the chance that an attacker obtains access to all secret shares.

Secret sharing usually exploits another property of the private exponent d, which is that there are infinitely many equivalent private exponents d' that can be used to decrypt a ciphertext. Let $k \in \mathbb{N}$ and $d'=d+k\phi(N)$. From Euler's theorem, we have that $C^{\phi(N)}$ mod $N=1$, and hence $C^{d'} \equiv C^{d+k\phi(N)} \equiv C^d \cdot 1^k \equiv C^d$ (mod N).

In symmetric cryptography the usual way to implement secret-sharing is to split the symmetric key into several parts that are XOR-ed, that is bitwise added together, to give back the original key. The same method can be used with RSA by replacing the XOR operation with a regular integer addition. The RSA private key can then be split in k parts $d_1^+$, $d_2^+, \ldots, d_k^+$ as follows:

$$d_i^+ = \begin{cases} \text{chosen arbitrarily} & \text{if } 1 \leq i < k, \\ (d - \Sigma_1^{k-1} d_i) \bmod \varphi(N) & \text{if } i = k. \end{cases} \quad (1)$$

The decryption using these shares is done as follows. First the ciphertext is decrypted using each key part separately to produce intermediate messages $M_i$, with $1 \leq i \leq k$. Then all messages are multiplied together to obtain the original cleartext message. We have $$M_1 = C^{d_1^+} \bmod N$$
$$M_2 = C^{d_2^+} \bmod N$$
$$\ldots$$
$$M_k = C^{d_k^+} \bmod N$$
$$M = M_1 \cdot M_2 \ldots M_k \bmod N$$

The method is illustrated, as mentioned before, in FIG. 1. Splitting the private key into multiple parts increases the number of bits the attacker has to guess. In addition, depending on the attack settings, the secret sharing may make the job of the attacker much harder or even impossible.

To protect against partial key exposure, a known technique is to extend the size of the private exponent by applying the Euler's theorem. For instance, let r be a 64-bit random integer. The idea consists in applying the secret sharing not to d directly but to $d'=d+r\phi(N)$. We have then as secret shares of the private key $$d_i^+ = \begin{cases} \text{chosen arbitrarily} & \text{if } 1 \leq i < k, \\ d' - (\Sigma_1^{k-1} d_i^+ \bmod \varphi(N)) & \text{if } i = k. \end{cases} \quad (2)$$

SUMMARY

Although the appended claims are directed to particular combinations of features, it should be understood that the scope of the disclosure also includes any novel feature or novel combination of features disclosed herein.

Features which are described in the context of separate embodiments may also be provided in combination in a single embodiment. Conversely, various features which are, for brevity, described in the context of a single embodiment, may also be provided separately or in any suitable subcombination.

This brief summary is not intended to limit the scope of the invention, but instead to highlight some features and introduce various aspects of the disclosure.

Various exemplary embodiments relate to performing, in a processor, a cryptographic process including: in an RSA process having a private key, d, splitting d into k shares, such that $d = \pi d_i^* \bmod \phi(N)$, $1 \leq i \leq k$, where N is the RSA modulus and $\phi(N)$ is the Euler totient function, and being provided a text, C, determining a text, M, such that $M = C^{\Pi d_i^* \bmod \Phi(N)} \equiv C^d \equiv M \pmod{N}$ for $1 \leq i \leq k$ such that M is computed with k modular exponentiations performed in a sequence such that $M_{i+1} = M_i^{d_i^*} \bmod N$ for $1 \leq i \leq k$ and where $M_1 = M$ and $C = M_{k+1}$.

Various exemplary embodiments relate to a device for transmitting a message, M, including: a memory; a processor in communication with the memory, the processor being configured to: perform a cryptographic process including an RSA process having a private key, d, being split into k shares, such that: $d = \Pi d_i^* \bmod \phi(N)$, $1 \leq i \leq k$, where N is the RSA modulus and $\phi(N)$ is the Euler totient function; and determining said message M after being provided a text, C, being capable of, by calculating $M = C^{\Pi d_i^* \bmod \Phi(N)} \equiv C^d \equiv M \pmod{N}$ for $1 \leq i \leq k$ such that M is computed with k modular exponentiations performed in a sequence such that $M_{i+1} = M_i^{d_i^*} \bmod N$ for $1 \leq i \leq k$ and where $M_1 = M$ and $C = M_{k+1}$.

BRIEF DESCRIPTION OF THE DRAWINGS

To facilitate an understanding of the disclosure, reference may be had to the accompanying drawings in which.

DETAILED DESCRIPTION OF EMBODIMENTS

Discussed is an advantageous process for of splitting the private key exponent in various applications. This process utilizes modular multiplication instead of addition to combine the exponent shares together. This process utilizes successive modular exponentiation applied to the ciphertext message. The RSA private key is split in k parts $d_1^*, d_2^*, \ldots, d_k^*$ as follows:

$$d_i^* = \begin{cases} \text{chosen arbitrarily} & \text{if } 1 \leq i < k, \\ d \cdot (\Pi_1^{k-1} d_i^{*,-1} \bmod \varphi(N)) & \text{if } i = k. \end{cases} \quad (3)$$

Using these secret shares we have $$(((C^{d_1*})^{d_2*}) \cdots )^{d_k*} = C^{\Pi d_i * \bmod \Phi(N)} = C^d = M \pmod{N}.$$

Figure 1:
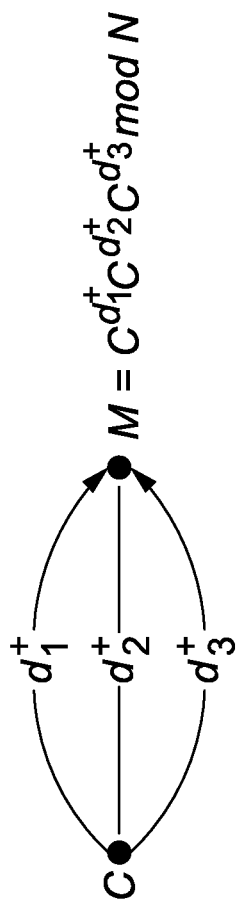
FIG. 1 is a diagram which illustrates a prior art process.
Figure 2:
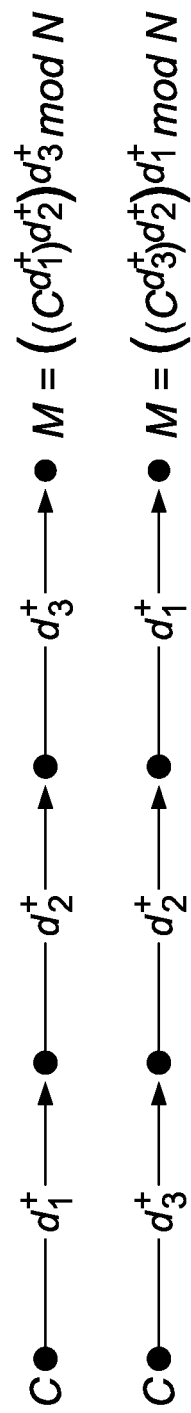
FIG. 2 is a diagram which illustrates an embodiment of the disclosure.

This method is illustrated in FIG. 2 for a three share decomposition of a private key.

In the following discussions, for simplicity, we assume two share decomposition of a private key, that is, $d = d_1^+ + d_2^+ \bmod \phi(N)$ or $d = d_1^* d_2^* \bmod \phi(N)$. The disclosed process has built-in resistance against partial key exposure attacks such as those discussed before. These attacks require that Marvin either knows $\tilde{d} = d \bmod 2^{n/4}$ or, given $\tilde{d}$, guesses k such that $e\tilde{d} = 1 + k\phi(N)$. In the former case, even if Marvin can recover all bits of $d_1^*$ and $d_2^*$, he cannot retrieve d without knowing $\phi(N)$, which is secret. In the latter case, the cost of retrieving k is on average $2^{n_1 n_2} \lg^{\lg e/n}$, which can be made sufficiently large to render the attack unpractical. For instance, if Marvin has to make more than $2^{64}$ guesses on average, it suffices to take a n-bit first share and a 48-bit second share when $e = 2^{16} + 1$ to protect against this attack. This only gives a sharing overhead of 5% for 1024-bit modulus, and 2% for 2048-bit modulus.

By contrast, the secret sharing methods discussed in the background are not resistant against partial key exposure attacks. Both $d_i^+$ must be at least n/4-bits long to protect against this previously discussed attack. Otherwise one party could retrieve the original private key exponent from his share. This means that, without further protection, the previously discussed method has a sharing overhead of at least ¼, i.e., 25% for both 1024-bit and 2048-bit modulus RSA. Hence the disclosed process allows safer and more efficient secret sharing.

The disclosed process requires less memory to recombine the shares together. Indeed, if both shares are computed by the same device, the device simply has to compute, $X = C^{d_1*} \bmod N$ and then to throw away C and compute $M = X^{d_2*} \bmod N$. In previously used processes the intermediate message must be kept for later recombination, and hence requires an additional n-bit buffer, which can be quite a significant issue on low-end devices.

Finally the disclosed process works with any standard RSA library, and for the same parameter length. More precisely, assume that Alice has only access to a simple device that provides an interface called RSADECRYPT( ) for some maximum modulus length n. This is sufficient for Alice to implement the disclosed sharing method, but not for the previously used method. For the latter, Alice also needs a modular multiplication interface that a simple device does not provide. Also, even if such interface did exist, the disclosed process still has the advantage of providing protection against partial key exposure, even for the largest key length supported by the device. With the previously used background process, Alice would have the choice of either reducing the maximum key size to allow for using the extended key d' as explained earlier, or using bigger shares with much higher sharing overhead.

We describe several illustrative embodiment processes. In the first process, Alice uses devices that provide the usual RSA decryption interface, as detailed in Process 1 below. We assume that these devices store the private key in some secure way, and that this key is fed into the device during some setup phase.

---
Process 1 RSADECRYPT - RSA decryption
---

Require: RSA private key pair <N, d>, ciphertext message $C \in \mathbb{Z}_N^*$.
Ensure: Plaintext message $M \in \mathbb{Z}_N^*$
    function RSADECRYPT (C, < N, d >)
        $M \leftarrow C^d \bmod N$
        return M
    end function

---

If Alice has several such devices, she could apply the disclosed process as follows. We assume she has two such devices. First, she splits her private key exponent d into two parts $d^*_1$ and $d^*_2$ as indicated in Equation (2). She initializes the first device with the key <N, $d^*_1$> and gives this device to her best friend Alix, who promised to not give access to the device to anyone else than Alice. Then she initializes her second device with the key <N, $d^*_2$>. Whenever she gets an encrypted message C, she visits her friend Alix, uses the first device to decrypt the message to produce a first intermediate message X, and then uses her own device to decrypt X and to produce the original cleartext message M.

All of Alice's devices do not need to be identical. In a second scenario, Alice would have a single powerful device, and several lightweight devices. These devices are typically less expensive and more power friendly, but are much slower at decrypting messages. Alice could implement the invention in a similar way while still achieving high overall performance. To achieve this, she would only generate small shares (e.g., 64-bit shares) for the lightweight devices, and compute the remaining share for her own more powerful device as given by Equation (3). Since the key processed by the lightweight devices are much shorter, the impact on the overall performance is smaller even though these devices are less powerful. Also, even if someone would steal Alice's device, they would not be capable to decrypt message targeted to Alice without cooperation with Alice's best friends. In a more specific scenario in a smart grid setup or internet of things there may be several sensors that are connected in a mesh network that produce a combined measurement. It is desired that the final measurement be signed by the complete network itself. To protect the key, a small share may be give to each of the sensors, and then a bigger share to, e.g. the network hub. Then a bigger device (i.e., one with the adequate processing capability) would collect the individual measurements from the network and combine them to produce the final encrypted measurement.

In a third embodiment, all shares are processed in a single device. This device mimics the same operations as in the first two embodiments, except that all parts are stored in the same device, and the devices call the RSADecrypt interface several times to decrypt a single message. This permits better protection against implementation attacks. See Process 2, below. The decryption steps do not need to all occur in sequence in the same function. They can be done in different functions, and done at different stages of the program to better hide the key shares.

---
Process 2 RSADECRYPTMULT - RSA decryption with multiplicative sharing
---

Require: Set of k private key pair <N, $d_i^*$>, $1 \leq i \leq k$ and $\Pi\, d_i^* = d \bmod \phi(N)$.
Require: Ciphertext C, with $C = \hat{M}^e \bmod N$
Ensure: $M = \hat{M}$ the original plain text message.
    function RSADECRYPTMULTI(C, {< N, $d_i^*$ >})
        $X \leftarrow C$
        for i ← 1 to k do
            $X \leftarrow$ RSADecrypt (X, < N, $d_i^*$ >)    (shares can be processed in any order)
        end for
        $M \leftarrow X$
        return M
    end function

---

In a fourth embodiment, a single device automatically computes new shares before decrypting a ciphertext message as in Process 3. This method adds a small overhead needed for the computation of the last share, but this is overall negligible. This method makes side-channel analysis much harder since all new decryption uses new key bits, and the attacker cannot use partial key exposure attack to reduce his workload. This method allows for using a key length that is equal to the maximum key length supported by the underlying integer library. The function RSADecryptRndShare can be parameterized by the number of shares k to generate, and the bit length m of the random shares (e.g., k=2, m=64).

---
Process 3 RSADECRYPTRNDSHARE - RSA decryption with random shares
---

Require: RSA private key pair < N, d >, ciphertext message $C \in \mathbb{Z}_N^*$
Ensure: Plaintext message $M \in \mathbb{Z}_N^*$.
    function RSADECRYPTRNDSHARE [k, m](C, {< N, $d_i^*$ >})
        for i ← 1 to k do
            Choose $d_i^*$ randomly in $\mathbb{Z}_{2^m}$
        end for
        $d_k^* \leftarrow d\, \Pi_1^{k-1} d_i^{*-1} \bmod \phi(N)$
        return RSADECRYPTMULT (C, {< N, $d_i^*$ >})
    end function

---

The disclosed processes are applicable wherever RSA is used, in electronic devices, in communication protocols, etc. They are particularly suited to domain of application where the key is more exposed and key bits more easily extractable, such as software cryptographic libraries or white-box implementations.

The process disclosed may be utilized to decrypt a session key which session key may be a symmetric key useful in decryption of block algorithms such as DES, 3DES, AES, etc. In other applications, the disclosed process may be used to authenticate a signature in a non-repudiation context. Furthermore, as mentioned, the disclosed process may be stored in a nontransitory machine readable storage device or a mobile phone, smart card, smart phone, computer, netbook or notebook, set top box or other device.

Figure 3:
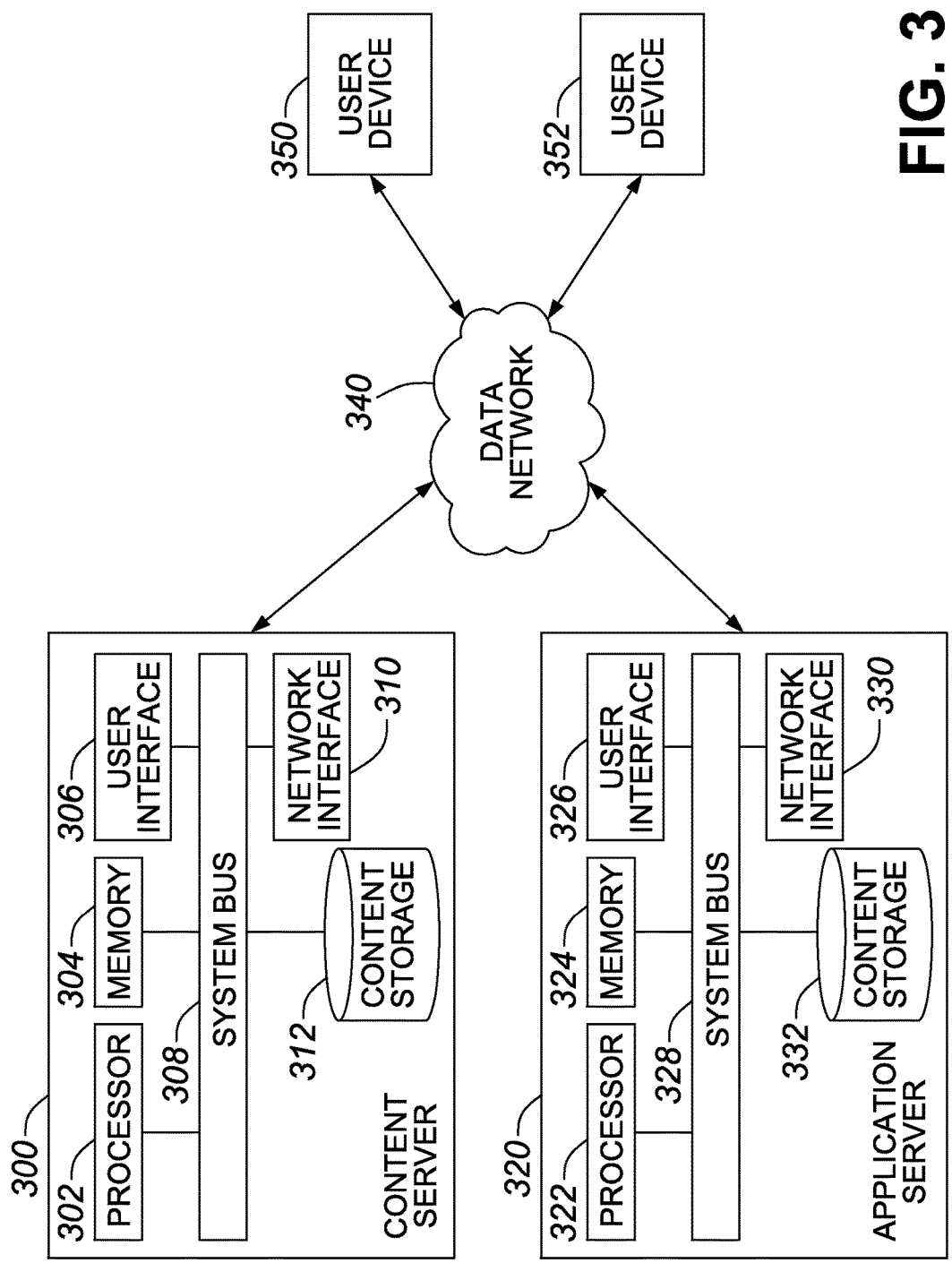
FIG. 3 is a diagram which shows a further illustrative embodiment.

FIG. 3 illustrates an example of a system for providing a user device secure content and a software application that processes the secure content. The system includes a content server 300, application server 320, user devices 350, 352, and a data network 340. The user devices 350, 352 may request access to secure content provided by the content server 300 via data network 340. The data network can be any data network providing connectivity between the user devices 350, 352 and the content server 300 and application server 320. The user devices 350, 352 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 300. The software application may be downloaded from the application server 320. The software application may be obscured using the techniques described above as well as operate as described above. Once the user devices 350, 352 install the software application, the user device may then download secure content from the content server 300 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 300 may control the access to the secure content provided to the user devices 350, 352. As a result when the content server 300 receives a request for secure content, the content server 300 may transmit the secure content to the requesting user device. Likewise, the application server 320 may control access to the software application provided to the user devices 350, 352. As a result when the content server 320 receives a request for the software application, the application server 320 may transmit the software application to the requesting user device. A user device requesting the software application or secure content may also be authenticated by the respective servers, before providing the software application or secure content to the user device.

The content server 300 may include a processor 302, memory 304, user interface 306, network interface 310, and content storage 312 interconnected via one or more system buses 308. It will be understood that FIG. 3 constitutes, in some respects, an abstraction and that the actual organization of the components of the device 300 may be more complex than illustrated.

The processor 302 may be any hardware device capable of executing instructions stored in memory 304 or storage 312. As such, the processor may include a microprocessor, field programmable gate array (FPGA), application-specific integrated circuit (ASIC), or other similar devices.

The memory 304 may include various memories such as, for example L1, L2, or L3 cache or system memory. As such, the memory 304 may include static random access memory (SRAM), dynamic RAM (DRAM), flash memory, read only memory (ROM), or other similar memory devices.

The user interface 306 may include one or more devices for enabling communication with a user such as an administrator. For example, the user interface 306 may include a display, a mouse, and a keyboard for receiving user commands.

The network interface 310 may include one or more devices for enabling communication with other hardware devices. For example, the network interface 310 may include a network interface card (NIC) configured to communicate according to the Ethernet protocol. Additionally, the network interface 310 may implement a TCP/IP stack for communication according to the TCP/IP protocols. Various alternative or additional hardware or configurations for the network interface 310 will be apparent.

The content storage 312 may include one or more machine-readable content storage media such as read-only memory (ROM), random-access memory (RAM), magnetic disk storage media, optical storage media, flash-memory devices, or similar storage media. In various embodiments, the content storage 312 may store content to be provided to users.

The application server 320 includes elements like those in the content server 300 and the description of the like elements in the content server 300 apply to the application server 320. Further, it is noted that the content server and applications server may be implemented on a single server. Also, such servers may be implemented on distributed computer systems as well as on cloud computer systems.

As will be understood, the modular exponentiation, encoding, or digital signature methods described herein may be deployed and utilized within the system of FIG. 3 or similar systems in various manners. For example, the user devices 350, 352 may be provided by a manufacturer or other seller preconfigured to transmit signed messages to the content server 300 to request the provision of content. Alternatively, the user devices 350, 352 may not be fully preconfigured for such operation; instead, the application server 320 may communicate with the user devices 350, 352 to effect such configuration. For example, the application server may transmit code instructions for implementing the methods described herein or data defining one or more lookup tables.

In further embodiments, the device or devices, which have received the above-mentioned download of our embodiment of the disclosed process may then, using the private key, authentically sign messages or documents or may authenticate various transactions. Embodiments of the disclosed process may be found in payment cards, payment-related software, security access, parking access, transit access and payments, as well as banking, software and digital media (movies, music, etc.) transmissions, as well as security applications on mobile phones.

The disclosed process may advantageously be employed in white box cryptographic applications. Although it may be used in grey-box or black-box applications also. The disclosed process may also be advantageously used to combat side channel attacks.

Various illustrative embodiments are described in reference to specific illustrative examples. The illustrative examples are selected to assist a person of ordinary skill in the art to form a clear understanding of, and to practice the various embodiments. However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

To the extent positional designations such as top, bottom, upper, lower have been used in describing this invention, it will be appreciated that those designations are given with reference to the corresponding drawings, and that if the orientation of the device changes during manufacturing or operation, other positional relationships may apply instead. As described above, those positional relationships are described for clarity, not limitation.

The present invention has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this invention encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

What is claimed is:

1. A non-transitory machine-readable storage medium encoded with instructions for execution by a processor using a white-box implementation in a cryptographic system for performing a cryptographic process, the non-transitory machine readable storage medium comprising:
in the white-box implementation of a Rivest-Shamir-Adleman (RSA) process having a private key, d, splitting d into k shares, where the length of the k shares are configured to be adapted to a maximum key length of an integer library, such that $$d = \Pi d_i^* \bmod \phi(N), 1 \leq i \leq k,$$

wherein N is the RSA modulus and $\phi(N)$ is the Euler totient function, and being provided a text, C, determining a text, M,
such that $M = C^{\Pi d_i^* \bmod \phi(N)} \equiv C^d \equiv M \pmod{N}$ for $1 \leq i \leq k$
such that M is computed with k modular exponentiations performed in sequence,
such that $M_{i+1} = M_i^{d_i^*} \bmod N$ for $1 \leq i \leq k$;
and where $M_1 = M$ and $C = M_{k+1}$.

2. The non-transitory machine-readable storage medium of claim 1, wherein the text M is a session key, password, secret data, or a digital signature.

3. The non-transitory machine-readable storage medium of claim 1, wherein a first subset of $\{d_i^*\}_{i=1 \ldots k}$ are stored on a first device and a second subset of $\{d_i^*\}_{i=1 \ldots k}$ are stored on a second device.

4. The non-transitory machine-readable storage medium of claim 3 wherein cardinality of $\{d_i^*\}_{i=1 \ldots j}$ stored on said first device is greater than cardinality of $\{d_i^*\}_{i=1 \ldots k}$ and stored on the second device.

5. The non-transitory machine-readable storage medium of claim 1, wherein
(a) $X_1 = C^{\Pi d_i^*} \bmod N$ is determined for all the $\{d_i^*\}$ which are stored on a first device and then,
(b) $M = X_2 = X_1^{\Pi d_i^*} \bmod N$ is determined for all the $\{d_i^*\}$ which are stored on a second device;
and wherein (a) and (b) are coupled by modular exponentiations computed in sequence.

6. The non-transitory machine-readable storage medium of claim 1, wherein C is a cipher text.

7. The non-transitory machine-readable storage medium of claim 1, wherein
(a) $X_1 = C^{\Pi d_i^*} \bmod N$ is determined for $\{d_i^*\}_{i=1 \ldots j}$ which are stored on a device; and
(b) $M = X_2 = X_1^{\Pi d_i^*} \bmod N$ is determined for $\{d_i^*\}_{i=1 \ldots k}$ which are stored on the same device;
and (a) and (b) are computed by modular exponentiations computed in sequence.

8. The non-transitory machine-readable storage medium of claim 1, wherein splitting d into k shares further comprises:
randomly selecting k−1 shares $d_i$; and
calculating $d_k$ as $d \Pi_1^{k-1} d_i^{-1} \bmod \phi(N)$.

9. A non-transitory machine-readable storage medium encoded with instructions for execution by a processor using a white-box implementation in a cryptographic system for performing a cryptographic process comprising:
performing the cryptographic process in the white-box implementation of a Rivest-Shamir-Adleman (RSA) process having a private key, d, splitting d into k shares, where the length of the k shares are configured to be adapted to a maximum key length of an integer library, such that $$d = \Pi d_i^* \bmod \phi(N), 1 \leq i \leq k,$$

wherein N is the RSA modulus and $\phi(N)$ is the Euler totient function, and being provided a text, C, determining a text, M,
such that $M = C^{\Pi d_i^*} \bmod \phi(N) \equiv C^d \equiv M \pmod{N}$ for $1 \leq i \leq k$
such that M is computed with k modular exponentiations performed in sequence,
such that $M_{i+1} = M_i^{d_i^*} \bmod N$ for $1 \leq i \leq k$;
and where $M_1 = M$ and $C = M_{k+1}$ on a user device having the non-transitory machine-readable storage medium.

10. A non-transitory machine-readable storage medium encoded with instructions for execution by a processor using a white-box implementation in a cryptographic system for performing a cryptographic process comprising:
performing the cryptographic process in the white-box implementation of a Rivest-Shamir-Adleman (RSA) process having a private key, d, splitting d into k shares, where the length of the k shares are configured to be adapted to a maximum key length of an integer library, such that $$d = \Pi d_i^* \bmod \phi(N), 1 \leq i \leq k,$$

wherein N is the RSA modulus and $\phi(N)$ is the Euler totient function, and
being provided a text, C, determining a text, M,
such that $M = C^{\Pi d_i^*} \bmod \phi(N) \equiv C^d \equiv M \pmod{N}$ for $1 \leq i \leq k$
such that M is computed with k modular exponentiations performed in sequence,
such that $M_{i+1} = M_i^{d_i^*} \bmod N$ for $1 \leq i \leq k$;

where $M_1=M$ and $C=M_{k+1}$; and
wherein a first subset of $\{d_i^*\}_{i=1\ldots k}$ are stored on a first device and a second subset of $\{d_i^*\}_{i=1\ldots k}$ are stored on a second device.

11. A non-transitory machine-readable storage medium encoded with instructions for execution by a processor using a white-box implementation in a cryptographic system for performing a cryptographic process comprising:
    performing the cryptographic in the white-box implementation of a Rivest-Shamir-Adleman (RSA) process having a private key, d, splitting d into k shares, where the length of the k shares are configured to be adapted to a maximum key length of an integer library, such that $$d=\Pi d_i^* \bmod \phi(N), 1\leq i\leq k,$$

wherein N is the RSA modulus and $\phi(N)$ is the Euler totient function, and being provided a text, C, determining a text, M,
    such that $M=C^{\Pi d_i^* \bmod \phi(N)}\equiv C^d\equiv M \pmod{N}$ for $1\leq i\leq k$
    such that M is computed with k modular exponentiations performed in sequence,
    such that $M_{i+1}=M_i^{d_i*} \bmod N$ for $1\leq i\leq k$;
where $M_1=M$ and $C=M_{k+1}$;
wherein
    (a) $X_1=C^{\Pi d_i*} \bmod N$ is determined for all the $\{d_i^*\}$ which are stored on a first device and then,
    (b) $M=X_2=X_1^{\Pi d_i*} \bmod N$ is determined for all the $\{d_i^*\}$ which are stored on a second device;
and wherein (a) and (b) are coupled by modular exponentiations computed in sequence.

12. A non-transitory machine-readable storage medium encoded with instructions for execution by a processor using a white-box implementation in a cryptographic system for performing a cryptographic process comprising:
    transmitting instructions between a first and second device for performing the cryptographic process in the white-box implementation of a Rivest-Shamir-Adleman (RSA) process having a private key, d, splitting d into k shares, where the length of the k shares are configured to be adapted to a maximum key length of an integer library, such that $$d=\Pi d_i^* \bmod \phi(N), 1\leq i\leq k,$$

wherein N is the RSA modulus and $\phi(N)$ is the Euler totient function, and being provided a text, C, determining a text, M,
    such that $M=C^{\Pi d_i^* \bmod \phi(N)}\equiv C^d\equiv M \pmod{N}$ for $1\leq i\leq k$
    such that M is computed with k modular exponentiations performed in sequence,
    such that $M_{i+1}=M_i^{d_i*} \bmod N$ for $1\leq i\leq k$;
where $M_1=M$ and $C=M_{k+1}$;
wherein a first subset of $\{d_i^*\}_{i=1\ldots k}$ are stored on the first device and a second subset of $\{d_i^*\}_{i=1\ldots k}$ are stored on the second device; and
wherein cardinality of $\{d_i^*\}_{i=1\ldots j}$ stored on the first device is greater than cardinality of $\{d_i^*\}_{i=1\ldots k}$ and stored on the second device.

13. A device for transmitting a message, M, comprising:
    a memory;
    a processor in communication with the memory, the processor being configured to:
        perform a cryptographic process including a white-box implementation of a Rivest-Shamir-Adleman (RSA) process having a private key, d, being split into k shares, where the length of the k shares are configured to be adapted to a maximum key length of an integer library, such that:

$$d=\Pi d_i^* \bmod \phi(N), 1\leq i\leq k,$$

wherein N is the RSA modulus and $\phi(N)$ is the Euler totient function; and
    determining said message M after being provided a text, C, being capable of, by calculating $$M=C^{\Pi d_i* \bmod \phi(N)}\equiv C^d\equiv M(\bmod N) \text{ for } 1\leq i\leq k$$

such that M is computed with k modular exponentiations performed in sequence, such that $$M_{i+1}=M_i^{d_i*} \bmod N \text{ for } 1\leq i\leq k$$

and where
    where $M_1=M$ and $C=M_{k+1}$; and
        transmitting the message, M, from the device to a second device.

14. The device of claim 13, wherein the text M is a session key, password, secret data, or a digital signature.

15. The device of claim 13, wherein the memory is further configured to store a first subset of $\{d_i^*\}_{i=1\ldots k}$ on said device and a second memory further configured to store a second subset of $\{d_i^*\}_{i=1\ldots k}$ on a second device.

16. The device of claim 15 in which the cardinality of $\{d_i^*\}_{i=1\ldots j}$ stored on said device is greater than cardinality of $\{d_i^*\}_{i=j+1\ldots k}$; and stored on said another device.

17. The device of claim 13, wherein the processor in communication with the memory is further configured to:
    (a) determine $X_1=C^{\Pi d_i*} \bmod N$ is determined for $\{d_i^*\}_{i=1\ldots j}$ which are stored on a device; and then
    (b) determine $M=X_2=X_1^{\Pi d_i*} \bmod N$ is determined for $\{d_i^*\}_{i=1\ldots k}$ which are stored on the second device;
and (a) and (b) are computed by modular exponentiations computed in sequence.

18. The device of claim 13 in which C is a cipher text.

19. The device of claim 13, wherein the processor is further configured to
    (a) determine $X_1=C^{\Pi d_i*} \bmod N$ for all the $\{d_i^*\}_{i=1\ldots j}$ which are stored on the device;
and then
    (b) determine $M=X_2=X_1^{\Pi d_i*} \bmod N$ for all the $\{d_i^*\}_{i=j+1\ldots k}$ which are stored on the device,
    wherein (a) and (b) are coupled by modular exponentiations computed in sequence.

20. The device of claim 13, wherein splitting d into k shares further comprises:
    randomly selecting k−1 shares $d_i$; and
    calculating $d_k$ as $d \Pi_1^{k-1} d_i^{-1} \bmod \phi(N)$.

* * * * *